United States Patent
Kim et al.

(10) Patent No.: US 9,162,098 B2
(45) Date of Patent: Oct. 20, 2015

(54) LIQUID GEL CONCENTRATE COMPOSITIONS AND METHODS OF USE

(75) Inventors: Melissa R. B. Kim, Alta Loma, CA (US); Howard L. Vandersall, Upland, CA (US); Dave P. Horton, Swansea, Pt. (CA)

(73) Assignee: ICL Performance Products LP, St. Louis, MO (US)

( * ) Notice: Subject to any disclaimer, the term of this patent is extended or adjusted under 35 U.S.C. 154(b) by 811 days.

(21) Appl. No.: 13/350,232

(22) Filed: Jan. 13, 2012

(65) Prior Publication Data

US 2013/0180738 A1    Jul. 18, 2013

(51) Int. Cl.
| | |
|---|---|
| A62D 1/00 | (2006.01) |
| C08K 5/04 | (2006.01) |
| C08L 33/02 | (2006.01) |
| C08K 5/01 | (2006.01) |
| C08K 5/17 | (2006.01) |

(52) U.S. Cl.
CPC ............. *A62D 1/0064* (2013.01); *C08K 5/01* (2013.01); *C08K 5/04* (2013.01); *C08K 5/17* (2013.01); *C08L 33/02* (2013.01)

(58) Field of Classification Search
None
See application file for complete search history.

(56) References Cited

U.S. PATENT DOCUMENTS

| | | | |
|---|---|---|---|
| 3,229,769 A | 1/1966 | Bashaw | |
| 4,336,145 A | 6/1982 | Briscoe | |
| 4,978,460 A | 12/1990 | Von Blucher et al. | |
| 5,190,110 A | 3/1993 | von Blucher et al. | |
| 5,641,480 A * | 6/1997 | Vermeer | 424/70.24 |
| 5,750,122 A * | 5/1998 | Evans et al. | 424/401 |
| 5,849,210 A | 12/1998 | Pascente et al. | |
| 5,989,446 A | 11/1999 | Hicks et al. | |
| 6,245,252 B1 | 6/2001 | Hicks et al. | |
| 6,386,293 B1 | 5/2002 | Bartlett | |
| 6,786,286 B1 | 9/2004 | Bartlett | |
| 7,189,337 B2 | 3/2007 | Sortwell | |
| 8,003,001 B1 * | 8/2011 | Kaiser et al. | 252/2 |
| 2005/0045849 A1 | 3/2005 | Sortwell | |
| 2006/0007531 A1 | 1/2006 | Korengut et al. | |
| 2006/0076531 A1 * | 4/2006 | Hagguist et al. | 252/4 |
| 2006/0157668 A1 | 7/2006 | Erdner et al. | |
| 2007/0001156 A1 | 1/2007 | Toreki | |
| 2007/0289752 A1 | 12/2007 | Beck et al. | |
| 2008/0006799 A1 | 1/2008 | Fowle | |
| 2008/0277633 A1 | 11/2008 | Leite et al. | |
| 2010/0276165 A1 | 11/2010 | Hobson et al. | |

FOREIGN PATENT DOCUMENTS

| | | | |
|---|---|---|---|
| WO | WO 0040212 A1 * | 7/2000 | |
| WO | 03/068843 A1 | 8/2003 | |
| WO | 2009/032587 A1 | 3/2009 | |
| WO | 2013/106435 | 7/2013 | |

OTHER PUBLICATIONS

International Search Report and Written Opinion for PCT/US2013/020837 dated Mar. 15, 2013.

* cited by examiner

*Primary Examiner* — Satya Sastri
(74) *Attorney, Agent, or Firm* — Thompson Coburn LLP

(57) ABSTRACT

Certain aspects of the invention are drawn to formulations and methods of making a liquid gel concentrate composition. Such liquid gel concentrates are formed by admixing an alkali-swellable polymer with an alkaline swelling agent in an oil-based suspending agent. The invention also provides for gelled water fire suppressants produced by mixing a liquid gel concentrate composition with water and methods of using such fire suppressants for combating fires.

24 Claims, No Drawings

LIQUID GEL CONCENTRATE COMPOSITIONS AND METHODS OF USE

BACKGROUND

Gelled water has been used as a fire suppressant, primarily on an experimental basis, since as early as the 1960s. Physically, gelled water varies from viscous, but readily flowable water, to semi-solid gelatinous materials that adhere to vertical surfaces. The physical characteristics of the gelled water used to suppress fire are varied dependent on the mode of application and the strategy being employed. Early gelling agents were granular or powdered and had to be pre-blended with water to form the gelled water to be applied. These gelling agents are typically referred to as super absorbent polymers or "SAPs". Gelled water is superior to liquid water in many fire suppressant applications because it adheres to fuels and surfaces much better than liquid water, which readily flows off the materials to be protected.

The use of early products was essentially discontinued because control of admixing the granular or powdered super absorbent polymers with water was difficult and time consuming and because their performance was greatly influenced by water hardness ions. More recently, concentrated liquid super absorbent polymers have been introduced as fire suppressant gels. These concentrated liquid products can be readily proportioned with water to form the viscous characteristics of the gel that are desired.

Super absorbent polymers (SAPs) are water soluble polymers than can absorb and retain extremely large volumes of water relative to their own mass. Currently available SAP type products generally consist of sodium and/or potassium salts of polyacrylic acid, polyacrylamide, or mixtures thereof suspended in suitable non-solvent liquids. These products can be easily proportioned with water to overcome prior mixing difficulties. However, they continue to suffer from the impact of water hardness ions present in the mix water used to prepare the gelled water.

SUMMARY OF THE INVENTION

The present invention provides for a liquid gel concentrate composition comprising an alkali swellable polymer, an alkaline swelling agent, and an oil-based suspending agent.

In certain embodiments, the alkali swellable polymer is a high molecular weight crosslinked acidic polyacrylic polymer or copolymer. In certain embodiments, the alkali swellable polymer is a polyacrylic acid crosslinked with allyl sucrose, polyacrylic acid crosslinked with allyl pentaerithrytol, or a polyacrylic acid crosslinked with both allyl sucrose and allyl pentaerithrytol.

In certain embodiments, the alkaline swelling agent is an amine with a $pK_a$ of greater than or equal to about 7. In certain embodiments, the alkaline swelling agent is an alkanolamine.

In certain embodiments, the oil-based suspending agent comprises a mineral oil, a vegetable oil, or a mixture thereof. In certain preferred embodiments, the vegetable oil is a seed oil. In certain embodiments, the liquid gel concentrate composition is pourable to at least 5° C.

The liquid gel concentrate composition may further comprises a thinning agent selected from the group consisting of sorbitan trioleate, sorbitan monooleate, salts of dodecyl benzene sulphonates, lecithin, and phospholipids. The liquid gel concentration may also further comprise a polar activator or a thickening agent.

The present invention also provides for methods of making a liquid gel concentrate composition as described herein where the method comprises admixing an alkali swellable polymer with an alkaline swelling agent in an oil-based suspending agent to form a suspension of a liquid gel concentrate composition. In certain embodiments, the alkali swellable polymer is added to the suspending agent before the addition of the alkaline swelling agent to the suspending agent.

The present invention also provides for methods of producing a gelled water fire suppressant comprising a super absorbent polymer. Such methods comprise adding a liquid gel concentrate composition described in this application to water.

The present invention also provides for methods of protecting a potential fuel source, such as a structure or building, from ignition. Such methods comprise adding a liquid gel concentrate composition of the invention to water and applying the resultant gelled water onto the potential fuel.

DETAILED DESCRIPTION

Various headings as used herein are meant for convenience only and are not to be interpreted as limiting the invention.

I. DEFINITIONS

The following definitions are provided to better define the present invention and to guide those of ordinary skill in the art in the practice of the invention. Unless otherwise noted, terms are to be understood according to conventional usage by those of ordinary skill in the relevant art.

Where a term is provided in the singular, the inventors also contemplate aspects of the invention described by the plural of that term unless otherwise indicated.

All weights, parts, and percentages used herein are based on weight unless otherwise specified.

As used herein, the term "water" refers to distilled and deionized water as well as tap water and other natural sources such as streams, ponds, lakes, etc. It is understood that in combating wildland fires, the use of distilled or deionized water is impractical and the available source of water may be, for example, hydrant, ditch, pond, lake, stream, or river water. Thus, used herein, "water" refers to any such aqueous solutions.

As used herein, the term "alkali swellable polymer" refers to a polymer that when introduced to a solution, imparts little or no viscosity, but upon adjusting the pH to mildly acidic, neutral, or mildly basic conditions, a measurable increase in viscosity is observed, i.e., adding an alkali agent to a solution containing an alkali swellable polymer results in the development of viscosity.

As used herein, the term "carbomer" refers to a polymer of acrylic acid cross-linked with a polyfunctional compound, hence, a poly (acrylic acid) or polyacrylate.

As used herein, the term "vegetable oil" refers to an oil extracted from the seed, fruit, or other part of a plant.

As used herein, the term "fuel" refers to any material that be consumed in a fire.

One of skill in the art will understand that the names of commercial products or trade names are listed for illustrative purposes only and are not intended to limit any compound or component from its generic family as described herein.

II. OVERVIEW

The present invention is drawn to a liquid gel concentrate composition comprising a novel liquid super absorbent polymer ("SAP") that when added to water forms a gelled water that demonstrates enhanced rates of viscosity development, provides high ultimate viscosity, and possesses an exceptional ability to adhere to both horizontal and vertical surfaces such as those composed of building materials including wood, metal, and glass, and to wildland fuels. These advantages have been achieved using chemistries different from those of currently used SAPs.

Currently available liquid SAP-type products merely suspend the salt of a super absorbent polymer in a suitable liquid. In the present invention, however, acidic and basic components of a polymer are combined in a liquid media that inhibits the formation of their salt until the concentrate of the components is diluted with water.

The performance of the gelled water of the compositions described herein is unique. Gelled water has approximately the same density as regular (non-gelled) water and generally exhibits only modest adhesive characteristics. When using liquid gel concentrates containing conventional super absorbent polymer salts, adhesion generally fails when the coating exceeds about 1-inch in thickness. Failure results when the gelled water begins to slide down and off of surfaces with a vertical component, thus accumulating on the ground below the material that needs protection. It has also been observed that gel concentrates containing conventional super absorbent polymer salts exhibit better performance on porous surfaces such as unpainted wood as opposed to smooth surfaces such as painted wood and glass. This is a deficiency of some products because most structures are painted and contain glass windows. It has been discovered that certain embodiments of the present invention overcome this deficiency because there is little observed difference in adhesive performance when tested on different types of substrates.

III. COMPOSITION

One aspect of the invention is drawn to formulations of a liquid gel concentrate composition. Such a liquid gel concentrate is formed by admixing an alkali-swellable polymer with an alkaline swelling agent in an oil-based suspending agent.

Alkali Swellable Polymer—

Alkali swellable polymers useful in the invention include, but are not limited to, high molecular weight crosslinked polyacrylic polymers and copolymers (copolymers have substitution of some of the acrylic acid with alkylmethacrylates), including acidic polymers and partially neutralized polymers. In certain embodiments, the alkali swellable polymer is a high molecular weight crosslinked acidic polyacrylic polymer or copolymer. Representative examples of crosslinking include polymers of acrylic acid crosslinked with allyl sucrose or allyl pentaerythritol or crosslinked with both allyl sucrose and allyl pentaerythritol (Carbopol homopolymers), polymers of acrylic acid and $C_{10}$-$C_{30}$ alkyl acrylate crosslinked with allyl pentaerythritol (Carbopol copolymers), and carbomer homopolymer or copolymer containing a block copolymer of polyethylene glycol and a long chain alkyl acid ester (Carbopol interpolymers). In certain embodiments, the alkali swellable polymer is a homopolymer of 2-propenoic acid (acrylic acid) crosslinked with polyalkenyl polyether, for example polymer allyl sucrose. Copolymers of acrylic acid with acrylic acid esters of methacrylate esters such that the product retains its alkali-swellable properties are also contemplated. Incorporation of other monomers into the polymer chain to improve, for example, ion tolerance while still retaining alkali swellable properties, will also provide a suitable alkali swellable polymer. Representative current trade names illustrative of the types of polymers useful in the invention are Carbopol, Carbopol EZ, and Carbopol ETD series of products from Lubrizol Inc., the Pemulen polymers also from Lubrizol Inc., and the Flogel polymer series from SNF Inc.

The amount of alkali swellable polymer present in the liquid gel concentrate composition may be as low as about 1.0 percent by weight of the concentrate composition. One of skill in the art would recognize, however, that by using a lower concentration of the alkali swellable polymer, more of the concentrate may have to be introduced with water to provide the desired results. The upper limit of the amount in the liquid gel concentrate composition may be limited by considerations of suspension stability and pourability. In certain embodiments, the alkali swellable polymer is present in an amount of from about 1.0 to about 30 percent by weight of the concentrate composition. In certain embodiments, the alkali swellable polymer is present in an amount of from about 10 to about 30 percent by weight of the concentrate composition. In certain embodiments, the alkali swellable polymer is present in an amount of from about 15 to about 25 percent by weight of the concentrate composition. In certain embodiments, the alkali swellable polymer is present in an amount of from about 10 to about 25 percent by weight of the concentrate composition. In certain embodiments, the alkali swellable polymer is present in an amount of from about 15 to about 30 percent by weight of the concentrate composition. In certain embodiments, the alkali swellable polymer is present in an amount of from about 20 to about 30 percent by weight of the concentrate composition.

Alkaline Swelling Agent—

Alkaline swelling agents useful in the invention include amines such as alkanolamines, alkali metal carbonates (e.g., sodium or potassium carbonate), silicates (e.g., sodium silicates), or in general non-hygroscopic or relatively non-hygroscopic inorganic bases of salts of alkali metals. Alkaline earth metals are also contemplated, but the presence of the alkaline earth metal may inhibit the development of viscosity. Hygroscopic alkali metal bases such as sodium and potassium hydroxide are not preferred because they are difficult to work with in suspensions.

When added to an oil-based suspending agent, the alkali swellable polymer and alkaline swelling agent form an essentially homogenous suspension. In certain embodiments where the alkaline swelling agent is an amine, the chain length of the alkyl group(s) on the amine should be relatively short in order to improve the rate of salt formation and viscosity development. In certain embodiments, the amine is a basic amine (e.g., pyridine is a non-basic amine) with a C:N stoichiometry of about 4:1 or less. It is desirable that the amine neutralize an acidic polymer to achieve a pH of greater than about pH 5. In certain embodiments, the basic amine has a $pK_a$ greater than or equal to about 7. In certain embodiments, the amine is an alkanolamine. Representative examples of alkanolamines include ethanolamine, diethanolamine, methyldiethanolamine, diisopropanol amine, methylethanolamine, monoisopropanolamine, triisopropanolamine, and triethanolamine. In certain embodiments, the amine is triethanolamine which has a favorable toxicological and environmental profile. Other examples of amines that may function as an alkaline swelling agent, but are less preferred due to their more hazardous nature, include n-butyl amine, diethylene triamine, and cyclohexyl amine.

The amount of alkaline swelling agent present in the liquid gel concentrate composition may be as low as about 1.0 percent by weight of the concentrate composition. One of skill in the art would recognize, however, that by using a lower concentration of the alkaline swelling agent, more of the concentrate may have to be introduced with water to provide the desired results. The upper limit of the amount in the liquid gel concentrate composition may be limited by considerations of suspension stability and pourability. In certain embodiments, the alkaline swelling agent is present in an amount of from about 1.0 to about 20 percent by weight of the concentrate composition. In certain embodiments, the alkaline swelling agent is present in an amount of from about 10 to about 20 percent by weight of the concentrate composition. In certain embodiments, the alkaline swelling agent is present in an amount of from about 5 to about 20 percent by weight of the concentrate composition. In certain embodiments, the alkaline swelling agent is present in an amount of from about 15 to about 20 percent by weight of the concentrate composition. In certain embodiments, the alkaline swelling agent is present in an amount of from about 12 to about 18 percent by weight of the concentrate composition. In certain embodiments, the alkaline swelling agent is present in an amount of from about 14 to about 17 percent by weight of the concentrate composition.

Oil-Based Suspending Agent—

The suspending agent of the invention is an oil-based, non-polar solvent composition. By "oil" it is meant both hydrocarbon oils, such as mineral oil, and organic oils, such as oils extracted from plants, fruits, or seeds, or other vegetable oils, representative examples of which include soya, sunflower, canola, peanut, coconut, and palm oils.

Maintaining a substantially water-free environment within the concentrated gel is of extreme importance. Therefore, the oil-based suspending agent should be substantially free of water. In certain embodiments, oils used in the oil-based suspending agent contain less than about 0.5% water. It is also preferred that the oils used have a flowable consistency for ease of mixing. In certain embodiments, one or more of the oils used in the oil-based suspending agent are readily flowable. In certain embodiments, one or more of the oils used in the oil-based suspending agent results in a suspension that is pourable to at least 5° C.

In certain embodiments, the oil-based suspending agent is a blend of oils including blends of mineral and vegetable oils. In certain embodiments, the oil-based suspending agent is a blend of oils including blends of mineral and seed oils. In certain embodiments, the oil-based suspending agent may be a blend that includes oil extracted from fruit. In some instances, it has been observed that a mixture of two or more different type of oils provide superior performance over the use of a single type of oil. For example, in certain embodiments, the formulation of the oil-based suspending agent comprises an oil mixture of at least about 70% mineral oil. In such embodiments, the oil mixture may also comprise up to about 30% of one or more vegetable oils. In certain embodiments, the oil mixed with mineral oil is an oil selected from the group consisting of soya, canola, peanut, and palm oil, or mixtures thereof. In certain embodiments, the formulation of the oil-based suspending agent comprises an oil mixture of at least about 70% of one or more vegetable oils such as soya, canola, peanut, and palm oil, or mixtures thereof. In such embodiments, the oil mixture may also comprise up to about 30% of mineral oil. In certain embodiments, the formulation of the oil-based suspending agent comprises an oil mixture of at least about 70% canola or soya oil which may also comprise up to about 30% of mineral oil. In certain embodiments, the oil-based suspending agent comprises from about 90% to about 100% of an oil and up to about 10% of other additives (not including the alkali swellable polymer and alkaline swelling agent).

The amount of oil-based suspending agent present in the liquid gel concentrate composition may be as high as about 98 percent by weight of the concentrate composition. One of skill in the art would recognize, however, that by using a high concentration of the oil-based suspending agent, and thus low amounts of the alkali swellable polymer and alkaline swelling agent, more of the concentrate may have to be introduced with water to provide the desired results. Further, it may be desirable that some amount of the liquid gel concentrate composition comprise additional additives. In certain embodiments, the oil-based suspending agent is present in an amount of from about 50 to about 98 percent by weight of the concentrate composition. In certain embodiments, the oil-based suspending agent is present in an amount of from about 50 to about 90 percent by weight of the concentrate composition. In certain embodiments, the oil-based suspending agent is present in an amount of from about 50 to about 80 percent by weight of the concentrate composition. In certain embodiments, the oil-based suspending agent is present in an amount of from about 50 to about 70 percent by weight of the concentrate composition. In certain embodiments, the oil-based suspending agent is present in an amount of from about 50 to about 60 percent by weight of the concentrate composition. In certain embodiments, the oil-based suspending agent is present in an amount of from about 60 to about 90 percent by weight of the concentrate composition. In certain embodiments, the oil-based suspending agent is present in an amount of from about 60 to about 80 percent by weight of the concentrate composition. In certain embodiments, the oil-based suspending agent is present in an amount of from about 60 to about 70 percent by weight of the concentrate composition. In certain embodiments, the oil-based suspending agent is present in an amount of from about 70 to about 90 percent by weight of the concentrate composition. In certain embodiments, the oil-based suspending agent is present in an amount of from about 70 to about 80 percent by weight of the concentrate composition.

In certain embodiments, the liquid gel concentrate composition may further comprise a polar activator. Without being bound by theory, it is thought that polar activators aid in hydration of organophilic clays. Representative examples of polar activators include ethanol, methanol, acetone, and propylene carbonate. In certain embodiments, the polar activator is propylene carbonate which is included in an amount of from about 1.0 to about 4.0 percent by weight as measured in the oil-based suspending agent. In certain embodiments, the liquid gel concentrate composition may also comprise a thickening agent, such as fumed silica or an organophilic clay, to adjust the end viscosity. Other representative examples of thickening agents include polymeric elastomers, such as polyisobutylene, and elastomeric copolymers of ethylene, styrene, and propylene, for example, those marked under the Kraton trade name. Many different organophilic clays are known to those of skill in the art, representative examples of which include Bentone 34, Bentone 38, Bentone 150, Bentone 155, Bentone 160, Bentone 910, Claytone I, Claytone II, and Claytone IMG-400. In certain embodiments, a thickening agent is included in an amount of from about 1.0 to about 6.0 percent by weight as measured in the oil-based suspending agent. In certain embodiments, the liquid gel concentrate composition may also comprise a thinning agent to adjust the end viscosity. Representative examples of useful thinning agents include: dodecylbenzene sulfonic acid, dodecylbenzene sulfonic acid, salt with isopropylamine; dodecylbenzene sulfonic acid, calcium salt, dodecylbenzene sulfonic acid, salt with triethanolamine, dodecylbenzenesulfonic acid, salt with ethanolamine, dodecylbenzenesulfonic acid, salt with diethanolamine, sorbitan monooleate, sorbition dioleate, sorbitan triolate, ethoxylates of sorbitan oleate esters, esters of sorbitan with other fatty acids or fatty oil products, lecithin, phospholipids, tall oil fatty acid esters with triethanolamine, coconut fatty acid diethanolamide, coconut fatty acid ethanolamide, and mixtures of coconut fatty acids with alkanolamides.

Another aspect of the invention is drawn to formulations of a gelled water composition comprising a liquid gel concentrate composition as described herein that has been proportioned with water. Depending on the viscosity desired and the ionic strength of the dilution water, the amount of liquid gel concentrate proportioned into the water is from about 0.1 to about 5.0 percent by volume (i.e., about 0.001 to about 0.05 volumes of concentrate per volume of water).

IV. METHODS OF MAKING

One aspect of the invention is drawn to the method of making a liquid gel concentrate. Such a liquid gel concentrate is formed by admixing an alkali swellable polymer with an alkaline swelling agent in an oil-based suspending agent. One of ordinary skill in the art would recognize that the alkaline swellable polymers and alkaline swelling agents are generally liquids or would be converted to liquid form by heat. However, these components may also be in powdered form, for example sodium metasilicate. Admixing of the components is typically achieved by mixing with sufficient shear to create a vortex in the fluid in the mixing vessel. Although not limited to a particular order, in certain embodiments, the alkali swellable polymer is added before adding the alkaline swelling agent. The combination of alkali swellable polymer, alkaline swelling agent, and liquid suspending agent forms a slurry also referred to as a suspension. The viscosity of a suspension may vary depending upon factors including mixing time, temperature of the base oil, quality of additives such as organophilic clays, etc. In certain embodiments, the viscosity of the suspension is adjusted after mixing. The desired viscosity may vary depending on the application. In certain embodiments, the viscosity is optimized to be a value of from about 800 cPs to about 1,200 cPs as measured on a Brookfield LVT viscometer using the LVT 4 spindle at a shear rate of 12.54 s$^{-1}$. If the viscosity is considered too low, it may be adjusted by incorporating a thickening agent such as an organophilic clay, resulting in an increase in viscosity. If the viscosity is considered too high, it may be lowered by incorporating a thinning agent.

Surprisingly, it was observed that by suspending the acid polymer and base in a non-polar solvent, formation of the salt (a polar compound) is not favored. Once the liquid gel concentrate is introduced to dilution water, however, the cross-linked polyacrylic acid and alkaline swelling agent react to form the salt of the polymer. This instantaneously results in the formation of a super absorbent polymer capable of absorbing large volumes of water with the resultant formation of viscous or gelled water.

The alkaline swelling agent should be added at a ratio such that the pH of a dilute aqueous solution of the liquid gel concentrate is in the range of from about pH 5 to about pH 10. In certain embodiments of the invention, the pH is adjusted to between about pH 5 and about pH 10. In certain embodiments, the pH is adjusted to between about pH 5 and about pH 8. In certain embodiments, the pH is adjusted to between about pH 6 and about pH 8. In certain embodiments, the amount of alkaline swelling agent is from about 0.3% by volume to about 3.0% by volume.

Because water hardness ions negatively impact the ability of super absorbent polymers to thicken or "gel" water, a "soft" water (i.e., water with a low level of hardness ions) is preferable. While a soft water is preferable, a hard or contaminated water can be used to obtain the same viscosity, however, the ratio of liquid gel concentrate to water may need to be increased to obtain equal performance. Water sources may vary at different locations, such as from as low as about 25 ppm to as high as about 300 or even about 1000 ppm of water hardness ions. Therefore, it may take from about 2 times to about 8 times as much liquid gel concentrate to compensate for water hardness. Salt from sea water is equivalent to hardness ions in negatively impacting the performance of super absorbent polymers. The pH of water is often observed to increase with the concentration of water hardness ions. Therefore, a slightly acidic or distilled water is theoretically preferable. However, the use of distilled water as the diluent is generally not practical for field use in combating fires.

V. METHODS OF USE

While water alone is an effective fire suppressant, it readily flows off of all except horizontal surfaces, leaving behind only a very thin damp coating on the surface that readily evaporates, particularly when exposed to the heat of a fire. When added to water, liquid gel concentrate compositions of the invention form a thickened to semi-solid form of water, or "gel," that exhibit a continuous range of viscosities dependent on the properties of the liquid gel concentrate in the dilution water. Depending on the viscosity desired and the ionic strength of the dilution water, the amount of liquid gel concentrate proportioned into the water is from about 0.1 to about 5.0% by volume (i.e., about 0.001 to about 0.05 volumes of concentrate per volume of water). The resulting gels are used to coat fuels regardless of configuration with a layer of gelled water that extends the length of time before ignition temperatures are reached.

The liquid gel concentrate composition of the invention can be added to water in a batch operation such as adding the proper volume of concentrate that will provide the desired viscosity to an agitated or recirculated volume of water. It can also be done continually by the controlled proportioning of the liquid gel concentrate with a stream of water, e.g., educting the liquid gel concentrate directly into the hose spraying water onto a fire or an object being protected from a fire. The gel:water reaction thickens the water being delivered. The stream of water can be applied directly onto the flames to obtain a reduction and then elimination of the flames or onto the object being protected in such a manner as to build up a thick gelled water coating on the surface.

When applied directly to suppress flames, a relatively low viscosity (from about 100 cps to about 1000 cps) flowable gel may be preferred. When applied aerially, the thickened solution has an improved capability of withstanding the turbulence encountered when exiting delivery aircraft, free-fall to, and impact with the fuel. This occurs because the gelled water maintains larger water droplet sizes under these high shear conditions. The larger and heavier droplets better survive the journey to the fire, thus providing a much greater percentage of the applied water within the target area, and causes a lesser percentage of the water that reaches the fuel from flowing off of the fuel to the ground.

When used to protect an object or structure, viscosities are generally much greater, e.g., from about 2000 cps to >10,000 cps as measured on a Brookfield LVT viscometer, #4 spindle at 60 rpm. The compositions described herein have the capability of adhering as unusually thick (2 inches to 4 inches) layers or coating of the gelled water onto the surface of the object. Higher viscosity gels can be characterized as semi-solids that will adhere to vertical structures and fuels coating them with an insulative water barrier that increases the length of time before ignition temperatures are reached. These gels can be used to either delay ignition until firefighters arrive or to protect a portion of a structure, or an adjacent structure from igniting until the fire is extinguished.

For example, for a two inch thick layer of gelled water on an object, the heat of a fire would be required to evaporate 288 cubic inches (1.25 gallons) of water spread uniformly on each square foot of surface being protected prior to ignition. The length of protection would depend on atmospheric conditions, the intensity of the fire, and the rapidity with which it advanced toward the object being protected.

It is contemplated that gels of the invention can be used in any application where it is desirable to increase the amount of water per unit area, and in turn, maintain a wet or damp condition for a longer period of time. Consequently, the gels of the invention could be used to prevent fir by applying them for protection in anticipation of the possibility of a fire, e.g., to protect log decks during periods of high fire danger.

IV. EXAMPLES

The following disclosed embodiments are merely representative of the invention which may be embodied in various forms. Thus, specific structural, functional, and procedural details disclosed in the following examples are not to be interpreted as limiting.

Example 1

Representative Formulations of Oil-Based Suspending Agents

TABLE 1

Representative formulation of an oil-based suspending agent

| Components | Example | Percent by Weight in Wet or Dry Concentrate |
|---|---|---|
| Mineral Oil | Exsal D-110 | 95.2 |
| Propylene Carbonate/Water 95:5 | Commodity | 3.6 |
| Bis-hydrogenated tallow-bis-methyl ammonium chloride | Claytone IMG-400 | 1.2 |

TABLE 2

Representative formulation of an oil-based suspending agent

| Components | Example | Percent by Weight in Wet or Dry Concentrate |
|---|---|---|
| Isomerized C14 Alfa-olefin | Amodrill 1410 | 93.2 |
| Propylene Carbonate/Water 95:5 | Commodity | 1.7 |
| Bis-hydrogenated tallow-bis-methyl ammonium chloride | Claytone IMG-400 | 5.1 |

TABLE 3

Representative formulation of an oil-based suspending agent

| Components | Example | Percent by Weight in Wet or Dry Concentrate |
|---|---|---|
| Mineral Oil | Exsal D-95 | 72 |
| Vegetable Oil | Canola Oil | 23 |
| Propylene Carbonate/Water 95:5 | Commodity | 1.3 |
| Bis-hydrogenated tallow-bis-methyl ammonium chloride | Claytone IMG-400 | 3.7 |

TABLE 4

Representative formulation of an oil-based suspending agent

| Components | Example | Percent by Weight in Wet or Dry Concentrate |
|---|---|---|
| Mineral Oil | Exsal D-60 | 95 |
| Bis-hydrogenated tallow-bis-methyl ammonium chloride treated with hexylene glycol | Bentone 150 | 5.0 |

TABLE 5

Representative formulation of an oil-based suspending agent

| Components | Example | Percent by Weight in Wet or Dry Concentrate |
|---|---|---|
| Vegetable Oil | Soya Oil | 93.6 |
| Propylene Carbonate/Water 95:5 | Commodity | 1.6 |
| Bentone 160 | Bentone 160 | 4.8 |

Example 2

Representative Formulations of Suspensions

The following examples of formulations of suspensions provide for viscosities consistent with or similar to viscosities from about 800 cPs to about 1,200 cPs as measured on a Brookfield LVT viscometer or equivalent using the LTV 4 spindle at a shear rate of 12.54 $s^{-1}$. As described herein, such viscosities can further be adjusted for optimization.

TABLE 6

Representative suspension formulation

| Components | Example | Percent by Weight in Wet or Dry Concentrate |
|---|---|---|
| Formulation of Table 2 | | 63.7 |
| Crosslinked Acrylic Acid | Carbopol EZ-2 | 20.5 |
| Triethanolamine | Commodity | 15.8 |

TABLE 7

Representative suspension formulation

| Components | Example | Percent by Weight in Wet or Dry Concentrate |
|---|---|---|
| Formulation of Table 5 | | 63.7 |
| Crosslinked Acrylic Acid | Flosperse FL-700 | 20.5 |
| Triethanolamine | Commodity | 15.8 |

TABLE 8

Representative suspension formulation

| Components | Example | Percent by Weight in Wet or Dry Concentrate |
|---|---|---|
| Formulation of Table 3 | | 63.7 |
| Crosslinked Acrylic Acid | Carbopol 690 | 20.5 |
| Triethanolamine | Commodity | 15.8 |

TABLE 9

Representative suspension formulation

| Components | Example | Percent by Weight in Wet or Dry Concentrate |
|---|---|---|
| Formulation of Table 4 | | 63.7 |
| Crosslinked Acrylic Acid | Carbopol 1623 | 20.5 |
| Triethanolamine | Commodity | 15.8 |

TABLE 10

Representative suspension formulation

| Components | Example | Percent by Weight in Wet or Dry Concentrate |
|---|---|---|
| Formulation of Table 1 | | 63.7 |
| Crosslinked Acrylic Acid | Flosperse FL-1000 | 20.5 |
| Triethanolamine | Commodity | 15.8 |

Example 3

TABLE 11

Representative formulation of liquid gel concentrate and use

| Components | Percent by Weight in Wet or Dry Concentrate | Percent by Weight in Dilute Solution at Preferred Use-levels |
|---|---|---|
| Polyacrylic Acid Crosslinked with Allyl Sucrose | 20.5 | 0.07-0.62 |
| Triethanolamine | 15.8 | 0.05-0.47 |
| Mineral Oil | 46.0 | 0.15-1.38 |
| Propylene carbonate | 0.8 | <0.01-0.02 |
| Water-free organophilic clay | 2.3 | <0.01-0.07 |
| Canola Oil | 14.6 | 0.05-0.44 |
| Lecithin | <1.0 | <0.001 |

The composition of Table 11 was proportioned with water by educting it directly into a fire hose as it was spraying onto a 4-foot-by-4-foot plywood sheet placed in a vertical orientation. Via multiple passes on the same position, it was possible to build up more than a 2-inch thick layer of water that clung to the plywood until it evaporated. Some of the gelled water remained visible on the surface 24 hours after application.

Further, the composition of Table 11 was proportioned with water according to the above, but impinging the sprayed gel onto vertical sheets of painted plywood and glass panels. Using the same application as above, gelled water coatings of more than 2-inches could be prepared. Some of the gelled water remained visible on the surfaces the following day.

What is claimed is:

1. A liquid gel concentrate composition for forming a fire suppressant, the composition comprising an alkali swellable polymer, an alkaline swelling agent, and an oil-based suspending agent, wherein the liquid gel concentrate composition contains less than 0.5% water and forms a fire suppressant.

2. The liquid gel concentrate composition for forming a fire suppressant of claim 1, wherein the alkali swellable polymer is a high molecular weight crosslinked acidic polyacrylic polymer or copolymer.

3. The liquid gel concentrate composition for forming a fire suppressant of claim 1, wherein the alkali swellable polymer is a homopolymer of 2-propenoic acid crosslinked with polyalkenyl polyether.

4. The liquid gel concentrate composition for forming a fire suppressant of claim 1, wherein the alkali swellable polymer is selected from the group consisting of polyacrylic acid crosslinked with allyl sucrose, polyacrylic acid crosslinked with allyl pentaerithrytol, and polyacrylic acid crosslinked with both allyl sucrose and allyl pentaerithrytol.

5. The liquid gel concentrate composition for forming a fire suppressant of claim 1, wherein the alkali swellable polymer is present in an amount of from about 10 to about 30 percent by weight of the concentrate composition.

6. The liquid gel concentrate composition for forming a fire suppressant of claim 1, wherein the alkaline swelling agent is an amine with a $pK_a$ of greater than or equal to about 7.

7. The liquid gel concentrate composition for forming a fire suppressant of claim 1, wherein the alkaline swelling agent is an alkanolamine.

8. The liquid gel concentrate composition for forming a fire suppressant of claim 1, wherein the alkaline swelling agent is triethanolamine.

9. The liquid gel concentrate composition for forming a fire suppressant of claim 1, wherein the alkaline swelling agent is present in an amount of from about 10 to about 20 percent by weight of the concentrate composition.

10. The liquid gel concentrate composition for forming a fire suppressant of claim 1, wherein the oil-based suspending agent comprises one or more of the oils that results in a suspension that is pourable to at least 5° C.

11. The liquid gel concentrate composition for forming a fire suppressant of claim 1, wherein the oil-based suspending agent comprises a mineral oil, a vegetable oil, or a mixture thereof.

12. The liquid gel concentrate composition for forming a fire suppressant of claim 11, wherein the vegetable oil is a seed oil.

13. The liquid gel concentrate composition for forming a fire suppressant of claim 1, wherein the oil-based suspending agent is present in an amount of from about 50 to about 80 percent by weight of the concentrate composition.

14. The liquid gel concentrate composition for forming a fire suppressant of claim 1, wherein the alkali swellable polymer is polyacrylic acid crosslinked with allyl sucrose, the alkaline swelling agent is triethanolamine, and the oil-based suspending agent comprises a mineral oil, a vegetable oil, or a mixture thereof.

15. The liquid gel concentrate composition for forming a fire suppressant of claim 1, wherein the alkali swellable polymer is polyacrylic acid crosslinked with allyl pentaerithrytol, or polyacrylic acid crosslinked with both allyl sucrose and allyl pentaerithrytol, the alkaline swelling agent is triethanolamine, and the oil-based suspending agent comprises a mineral oil, a vegetable oil, or a mixture thereof.

16. The liquid gel concentrate composition for forming a fire suppressant of claim 1, wherein the concentrate composition is pourable to at least 5° C.

17. The liquid gel concentrate composition for forming a fire suppressant of claim 1, wherein the composition further comprises a thinning agent selected from the group consisting of sorbitan trioleate, sorbitan monooleate, salts of dodecyl benzene sulphonates, and phospholipids.

18. The liquid gel concentrate composition for forming a fire suppressant of claim 1, wherein the composition further comprises lecithin.

19. A method of making a liquid gel concentrate composition for forming a fire suppressant, the method comprising admixing an alkali swellable polymer with an alkaline swelling agent in an oil-based suspending agent to form a suspension of a liquid gel concentrate composition, wherein the resulting liquid gel concentrate composition contains less than 0.5% water and forms a fire suppressant.

20. The method of claim 19, wherein the alkali swellable polymer is added to the suspending agent before the addition of the alkaline swelling agent to the suspending agent.

21. The method of claim 19, wherein the alkali swellable polymer is a high molecular weight crosslinked acidic polyacrylic polymer or copolymer.

22. The method of claim 19, wherein the alkaline swelling agent is an amine with a $pK_a$ of greater than or equal to about 7.

23. The method of claim 19, wherein the alkaline swelling agent is an alkanolamine.

24. The method of claim 19, wherein the oil-based suspending agent comprises a mineral oil, a vegetable oil, or a mixture thereof.

* * * * *